US012386876B2

(12) United States Patent
Cho et al.

(10) Patent No.: US 12,386,876 B2
(45) Date of Patent: Aug. 12, 2025

(54) TEXT-BASED DOCUMENT CLASSIFICATION METHOD AND DOCUMENT CLASSIFICATION DEVICE

(71) Applicant: SAMSUNG SDS CO., LTD., Seoul (KR)

(72) Inventors: Sooah Cho, Seoul (KR); Youngjune Gwon, Seoul (KR); Seongho Joe, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 78 days.

(21) Appl. No.: 17/975,155

(22) Filed: Oct. 27, 2022

(65) Prior Publication Data

US 2023/0134169 A1 May 4, 2023

(30) Foreign Application Priority Data

Oct. 29, 2021 (KR) ........................ 10-2021-0147324

(51) Int. Cl.
*G06F 16/00* (2019.01)
*G06F 16/3332* (2025.01)
*G06F 16/35* (2019.01)
*G06V 30/416* (2022.01)

(52) U.S. Cl.
CPC .......... *G06F 16/35* (2019.01); *G06F 16/3334* (2019.01); *G06V 30/416* (2022.01)

(58) Field of Classification Search
CPC ...................................... G06F 16/35
USPC ......................................... 707/740
See application file for complete search history.

(56) References Cited

U.S. PATENT DOCUMENTS

| | | | | |
|---|---|---|---|---|
| 2010/0250547 A1* | 9/2010 | Grefenstette | ........... | G06F 16/30 707/754 |
| 2011/0078191 A1* | 3/2011 | Ragnet | ................. | G06F 18/214 707/780 |
| 2011/0258195 A1* | 10/2011 | Welling | ............... | G06V 30/262 707/740 |
| 2017/0092146 A1* | 3/2017 | Shimada | ............ | H04N 1/00795 707/707 |
| 2018/0025003 A1* | 1/2018 | Marriott | ................. | G06Q 30/02 707/740 |

FOREIGN PATENT DOCUMENTS

KR       10-2019194 B1    9/2019

* cited by examiner

*Primary Examiner* — Alexandria Y Bromell
(74) *Attorney, Agent, or Firm* — Sughrue Mion, PLLC

(57) ABSTRACT

The present disclosure relates to a text-based document classification method and a document classification device. A text-based document classification method according to an embodiment of the present disclosure is performed by a processor inside a computing device, and may include: extracting, from a document image that has been input, words included in the document image; generating, based on a degree of similarity between the words, a word set including a configured number of words; generating a word set image by individually turning the word set into an image; extracting an important keyword used for document classification among words included in the word set image; and classifying a type of the document image by using the important keyword.

14 Claims, 9 Drawing Sheets

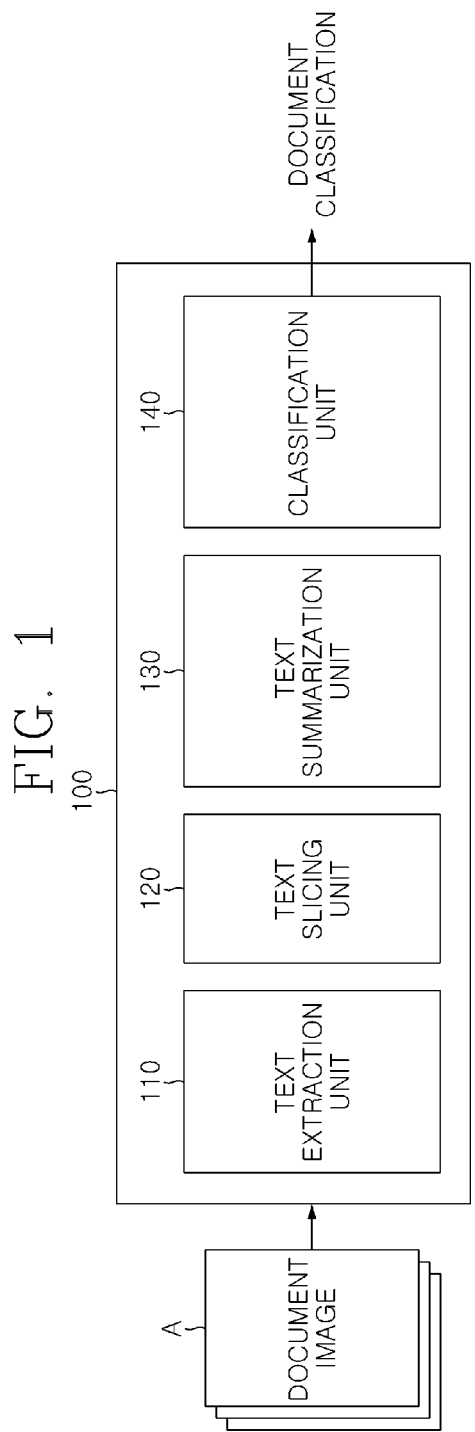

FIG. 2A

| BALANCE/DEPOSIT CERTIFICATE | | | 00 BANK | |
|---|---|---|---|---|
| ACCOUNT HOLDER | | CERTIFICATE NUMBER:0000000 | | |
| AMOUNT | 1,777,777 | ACCOUNT NUMBER | 000-000-000000 |
| AMOUNT | 1,777,777 | ACCOUNT NUMBER | 000-000-000000 |

FIG. 2B

```
BALANCE/DEPOSIT CERTIFICATE    ACCOUNT NUMBER
00 BANK                        000-000-000000
ACCOUNT HOLDER                 AMOUNT
CERTIFICATE NUMBER             1,777,777
0000000                        ACCOUNT NUMBER
                               000-000-000000
                               AMOUNT
                               1,777,777
```

FIG. 3A

| BALANCE/DEPOSIT CERTIFICATE | ACCOUNT HOLDER |
|---|---|
| 000-000-000000 | |

~G1

| 00 BANK | CERTIFICATE NUMBER |
|---|---|
| 1,777,777 | |

BALANCE/DEPOSIT CERTIFICATE
ACCOUNT HOLDER
000-000-000000

I2

00 BANK
CERTIFICATE NUMBER
1,777,777

TEXT-BASED DOCUMENT CLASSIFICATION METHOD AND DOCUMENT CLASSIFICATION DEVICE

CROSS-REFERENCE TO RELATED APPLICATION(S)

This application is based on and claims priority under 35 U.S.C. 119 to Korean Patent Application No. 10-2021-0147324, filed on Oct. 29, 2021, in the Korean Intellectual Property Office, the disclosure of which is herein incorporated by reference in its entirety.

BACKGROUND OF THE INVENTION

1. Field of the Invention

The present disclosure relates to a text-based document classification method and a document classification device and, more particularly, to a document classification method and a document classification device wherein unimportant information among the text inside a document is deleted, and important information is summarized, thereby enabling accurate document classification.

2. Description of the Prior Art

Methods for classifying documents on the basis of text information included in the documents include a rule-based classification method in which, if a specific word exists within text information extracted from a document, the same is classified as a specific document, a method in which texts extracted from a recurrent neural network (RNN) are successively input and classified, and the like.

The rule-based classification method has a problem in that, although no problem occurs if a document is completely extracted from a text, typographical errors may occur in the extracted text in the case of a document having no guaranteed document quality (for example, scan document), and rules need to be additionally input to deal with the typographical errors.

If the RNN or the like is used to classify documents, it is possible to apply document classification by grasping the overall context even if the text has some typographical errors. In the case of RNN, however, extracted texts are successively analyzed to classify documents, and the size of the RNN is determined according to the text length. In the case of learning and inference related to a neural network, necessary resources differ greatly depending on the network size, and it is thus necessary to summarize texts such that only important information among the text to be used for document classification can be used.

SUMMARY OF THE INVENTION

The present disclosure may provide a text-based document classification method and a document classification device wherein unimportant words among words included in a document are deleted, and important information is used to summarize the document, thereby enabling document classification.

The present disclosure may provide a text-based document classification method and a document classification device wherein, even in the case of a document having a large amount of unnecessary information (for example, persona information), document classification accuracy can be maintained without increasing the size of the document classification model.

A text-based document classification method performed by a processor inside a computing device according to an embodiment of the present disclosure may include: extracting, from a document image that has been input, words included in the document image; generating, based on a degree of similarity between the words, a word set including a configured number of words; generating a word set image by individually turning the word set into an image; extracting an important keyword used for document classification among words included in the word set image; and classifying a type of the document image by using the important keyword.

In the generating of a word set, the word set may be generated so as to minimize the degree of similarity between the configured number of words included in the word set.

In the generating of a word set, the words may be subjected to word embedding such that respective words are distributed across a space according to meaning, and a degree of semantic similarity between the words may be calculated by calculating a spatial distance between the words.

In the generating of a word set image, positions of the words inside the word set image may be randomly arranged, and the words may have an identically configured size, thereby generating the word set image.

In the extracting of an important keyword, when the word set image is input, and when a text describing the word set image is to be generated by using an image captioning model, words focused on by the image captioning model among the word set image may be extracted, and the extracted words may be configured as the important keywords.

In the extracting of an important keyword, a heatmap indicating an area focused on by the image captioning model in the word set image may be extracted, and the important keyword may be configured by using the heatmap.

The image captioning model may be learned such that, when a word set image generated from a learning image is input thereto, a text describing the word set image is generated, the text and a correct answer sheet regarding a document type of the learning image are compared, thereby generating an error, and the error is minimized.

A computer-readable storage medium according to an embodiment of the present disclosure stores commands which, when executed by a processor, cause a device including the processor to perform operations for text-based document classification, and the operations may include: extracting, from a document image that has been input, words included in the document image; generating, based on a degree of similarity between the words, a word set including a configured number of words; generating a word set image by individually turning the word set into an image; extracting an important keyword used for document classification among words included in the word set image; and classifying a type of the document image by using the important keyword.

In the generating of a word set, the word set may be generated so as to minimize the degree of similarity between the configured number of words included in the word set.

In the generating of a word set, the words may be subjected to word embedding such that respective words are distributed across a space according to meaning, and a degree of semantic similarity between the words may be extracted by calculating a spatial distance between the words.

In the extracting of an important keyword, when the word set image is input, and when a text describing the word set image is to be generated by using an image captioning model, words focused on by the image captioning model among the word set image may be extracted, and the extracted words may be configured as the important keywords.

In the extracting of an important keyword, a heatmap indicating an area focused on by the image captioning model in the word set image may be extracted, and the important keyword may be configured by using the heatmap.

The image captioning model may be learned such that, when a word set image generated from a learning image is input thereto, a text describing the word set image is generated, the text and a correct answer sheet regarding a document type of the learning image are compared, thereby generating an error, and the error is minimized.

A document classification device according to an embodiment of the present disclosure includes a processor, and the processor may perform: extracting, from a document image that has been input, words included in the document image; generating, based on a degree of similarity between the words, a word set including a configured number of words; generating a word set image by individually turning the word set into an image; extracting an important keyword used for document classification among words included in the word set image; and classifying a type of the document image by using the important keyword.

In the generating of a word set, the word set may be generated so as to minimize the degree of similarity between the configured number of words included in the word set.

In the generating of a word set, the words may be subjected to word embedding such that respective words are distributed across a space according to meaning, and a degree of semantic similarity between the words may be extracted by calculating a spatial distance between the words.

In the generating of a word set image, positions of the words inside the word set image may be randomly arranged, and the words may have an identically configured size, thereby generating the word set image.

In the extracting of an important keyword, when the word set image is input, and when a text describing the word set image is to be generated by using an image captioning model, words focused on by the image captioning model among the word set image may be extracted, and the extracted words may be configured as the important keywords.

In the extracting of an important keyword, a heatmap indicating an area focused on by the image captioning model in the word set image may be extracted, and the important keyword may be configured by using the heatmap.

The image captioning model may be learned such that, when a word set image generated from a learning image is input thereto, a text describing the word set image is generated, the text and a correct answer sheet regarding a document type of the learning image are compared, thereby generating an error, and the error is minimized.

In addition, the above-mentioned technical solutions do not enumerate all features of the present disclosure. Various features of the present disclosure and advantageous effects resulting therefrom will be understood more clearly from the following detailed embodiments.

A text-based document classification method and a document classification device according to an embodiment of the present disclosure is advantageous in that unimportant words among words included in a document are deleted, and important information is used to summarize the document such that, even in the case of a document having a large amount of unnecessary information (for example, persona information), document classification accuracy can be maintained without increasing the size of the document classification model.

A text-based document classification method and a document classification device according to an embodiment of the present disclosure is advantageous in that the meaning of words extracted from a document during document summarization may be considered, and the influence of erroneous recognition occurring during text extraction, document mode change, and the like may be minimized during summarization. Accordingly, documents can be accurately summarized, thereby reducing the degree of complexity of a document classification model for document classification.

However, advantageous effects obtainable by the text-based document classification method and document classification device according to embodiments of the present disclosure are not limited to the above-mentioned advantageous effects, and other advantageous effects not mentioned herein will be clearly understood from the following description by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which:

FIG. 1 is a block diagram of a text-based document classification device according to an embodiment of the present disclosure;

FIG. 2A and FIG. 2B schematically illustrate a document image and a text extracted from the document image according to an embodiment of the present disclosure;

FIG. 3A and FIG. 3B schematically illustrate a word set and a word set image according to an embodiment of the present disclosure;

DETAILED DESCRIPTION OF THE EXEMPLARY EMBODIMENTS

Figure 4:
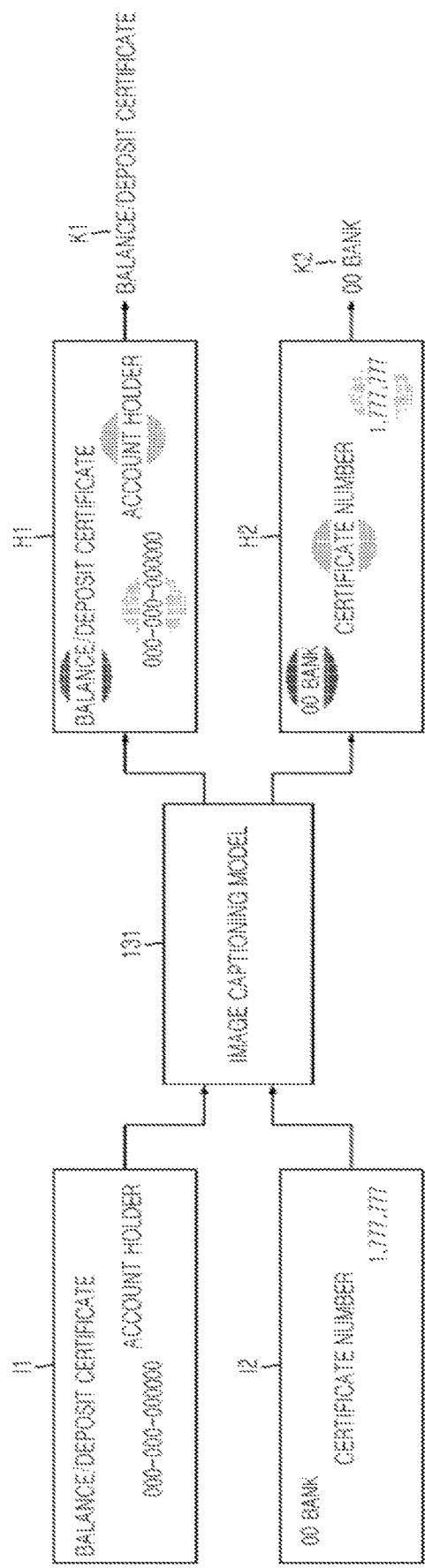
FIG. 4 schematically illustrates a text summary using an image captioning model according to an embodiment of the present disclosure.

Hereinafter, embodiments disclosed in this specification will be described in detail with reference to the accompanying drawings. Objectives, peculiar advantageous, and novel features of the present disclosure will become clearer from following descriptions and exemplary embodiments taken together with the accompanying drawings.

Terms or words used in this specification and the claims correspond to concepts defined appropriately by inventors to best describe the disclosure, are to be interpreted as having meanings and concepts conforming to the technical idea of the present disclosure, are given only to describe embodiments, and are not to be interpreted as limiting the present disclosure.

In connection with assigning reference numerals to components, identical or similar components will be given identical reference numerals, and repeated descriptions thereof will be omitted herein. Suffixes "module" and "unit" regarding components used in the following description are assigned or used interchangeably such that the specification can be composed easily, do not have meanings or roles distinguished from each other per se, and may denote software or hardware components.

In connection with describing components of the present disclosure, a component expressed in a singular form is to be understood as including a plural form of the component unless otherwise specified. In addition, terms such as "first", "second", and the like are used to distinguish a component from another component, and the component is not limited by such terms. In addition, the description that a component is connected to another component includes the possibility that another component may be connected between the two components.

In addition, in connection with describing embodiments disclosed in this specification, detailed descriptions regarding relevant known arts may be omitted when it is determined that such descriptions may obscure the gist of embodiments disclosed in this specification. In addition, the accompanying drawings are only for facilitating understanding of embodiments disclosed in this specification, and do not limit the technical idea disclosed in this specification, which is to be understood as including all changes, equivalents, and replacements falling within the idea and technical scope of the present disclosure.

FIG. 1 is a block diagram of a text-based document classification device according to an embodiment of the present disclosure.

Referring to FIG. 1, the text-based document classification device 100 according to an embodiment of the present disclosure may include a text extraction unit 110, a text sliding unit 120, a text summarization unit 130, and a classification unit 140. The text-based document classification device 100 or respective components 110-140 constituting the same may be implemented through the computing device illustrated in FIG. 9.

The text-based document classification device 100 according to an embodiment of the present disclosure will now be described with reference to FIG. 1.

The text extraction unit 110 may extract, from an input document image A, words included in the document image A. The text extraction unit 110 may apply a character recognition algorithm such as optical character recognition (OCR) to the document image A, and may output words extracted from the document image A by using the character recognition algorithm. Any type of character recognition algorithm is applicable as long as the same can extract words from the document image A.

Meanwhile, referring to FIG. 2A and FIG. 2B, "00 Bank balance certificate" may be input as a document image A as in FIG. 2A, and the text extraction unit 110 may extract words included in the document image A by applying the character recognition algorithm. It may be identified, with reference to FIG. 2B, that words T such as "balance/deposit certificate", "00 Bank", "account holder", "certificate number", "000000", "account number", "000-000-000000", "amount", "1,777,777", "account number", "000-000-000000", "amount", and "1,777,777" from the document image A.

The text slicing unit 120 may generate at least one word set including a configured number of words, based on the degree of similarity between words extracted by the text extraction unit 110.

Particularly, the text slicing unit 120 may calculate the degree of similarity between words. Depending on embodiments, words may be word-embedded according to a scheme such as word2vec such that respective words are distributed in a space, and the spatial distance between respective words may be calculated, thereby obtaining the degree of semantic similarity between words. For example, the calculated degree of similarity between "balance/deposit certificate" and "amount" in FIG. 2B may be 0.65 (relatively close), while that between "balance/deposit certificate" and "000-000-000000" may be 0.02 (relatively distant).

The text slicing unit 120 may then generate a word set so as to include a configured number of words. The word set may be generated to minimize the degree of similarity between words included in the same word set. That is, the text slicing unit 120 may combine words having a low degree of similarity, thereby generating a word set having a minimized degree of similarity between words within the set. In this case, the total sum of degrees of similarity of the entire word set may be minimized as well.

FIG. 3A illustrates word sets, the configured number of which is 3. The first word set G1 may include [balance/deposit certificate, 000-000-000000, account holder], and the second word set G2 may include [00 Bank, 1,777,777, certificate number]. Respective word sets G1 and G2 may be generated to have no overlapping words, and a total of four word sets may thus be generated if the entire number of words is 11. Meanwhile, the number of word sets generated by the text slicing unit 120 may be variously modified (one or more) depending on the number of words included in the document image A, and the configured number.

The text slicing unit 120 minimizes the degree of similarity between words included in respective word sets G1 and G2, and may thus minimize the semantic correlation between words in respective word sets G1 and G2. This may reduce the risk that, during text summarization using word sets, words having high degrees of importance will be deleted. That is, during text summarization, the result of summarization is derived with regard to each word set, and if a high degree of similarity between respective words included in a word set is configured, important words crucial to document classification may be deleted. For example, when the words T in FIG. 2B are grouped into words having high degrees of similarity so as to generate word sets, the generated word sets may be as follows: [account number, account number, account holder], [000-000-000000, 000-000-000000, 1,777,777], [00 Bank, balance/deposit certificate, certificate number]. In this case, [account number, account number, account holder] may be summarized as "account holder", [000-000-000000, 000-000-000000, 1,777,777] may be summarized as "000-000-000000", and [00 Bank, balance/deposit certificate, certificate number] may be summarized as "balance/deposit certificate". That is, "00 Bank" and "balance/deposit certificate" all correspond to major information for document classification, but "00

Bank" and "balance/deposit certificate" are included in the same word set. In this case, "00 Bank" which is major information for document classification may be deleted by summarization. Therefore, the text slicing unit 120 may combine words having low degrees of similarity when generating word sets, thereby preventing important words from being deleted by summarization.

After generating word sets, the text slicing unit 120 may turn respective word sets into individual images, thereby generating word set images. As illustrated in FIG. 3B, positions of words in respective word set images I1 and I2 may be randomly arranged, but the words may have the same configured size. That is, words may maintain an identical size in order to prevent the text summarization unit 130 from being affected by the size of words in the word set images I1 and I2.

The word sets images I1 and I2 generated by the text slicing unit 120 may be input to the text summarization unit 130, and the text summarization unit 130 may perform summarization on the basis of the word set images I1 and I2. That is, instead of word sets, the word set images I1 and I2 may be used. When the word set images I1 and I2 are used, even if words are erroneously recognized during text extraction from the document image A, or even if the format of the document image A itself is partially changed, the influence thereof can be minimized.

Particularly, if the document image A has a poor quality, the text extraction unit 110 may erroneously recognize "00 Bank" as "00 Bang", for example. "00 Bank" and "00 Bang" are different words but have almost similar feature points from image point of view. Therefore, if the word set images I1 and I2 are used, the text summarization unit 130 may provide the same text summarization result as in the case of "00 Bank" in spite of the difference between "00 Bank" and "00 Bang". That is, in spite of erroneous recognition during text extraction, the influence thereof can be minimized.

In addition, the text slicing unit 120 does not use the document image A itself, but uses word set images generated by using words extracted from the document image A, and thus can perform document classification identically even when the format of the document image A is partially changed, for example. That is, the change in format of the document image A is not reflected in the word set images, and the influence of the change in format of the document image A can be minimized by using the word set images.

The text summarization unit 130 may extract important keywords used for document classification among words included in word set images. As illustrated in FIG. 4, the text summarization unit 130 may include an image captioning model 131, and may extract important keywords K1 and K2 from the word set images I1 and I2 by using the image captioning model 131.

The image captioning model 131 may have learned such that, if multiple word set images I1 and I2 are input thereto, the same generates a caption which is a text describing the multiple word set images I1 and I2. The image captioning model 131 may be configured to perform image captioning according to a show-attend-and-tell scheme. Accordingly, during a caption generating process, the image captioning model 131 may focus on a single word included in the multiple image set images I1 and I2, and may generate a caption on the basis of the word in focus. Words focused on by the image captioning model 131 may be deemed to be important words in the corresponding word set images I1 and I2. Therefore, the text summarization unit 130 may deem words focused on by the image captioning model 131 to be important keywords K1 and K2.

Particularly, as illustrated in FIG. 4, upon receiving an input of word set images I1 and I2, the image captioning model 131 may perform an operation of generating a caption regarding the word set images I1 and I2, and may generate heatmaps H1 and H2 during that process. The heatmaps H1 and H2 indicate areas focused on by the image captioning mode 131, among images included in the word set images I1 and I2, while generating a caption, and the more an area is focused on, the more densely the area may be shaded.

In the case of the first heatmap H1 in FIG. 4, "balance/deposit certificate" is the most densely shaded among "balance/deposit certificate", "000-000-000000", and "account holder", and "balance/deposit certificate" may be deemed most focused on. Therefore, the text summarization unit 130 may extract "balance/deposit certificate" as an important keyword K1. In the case of the second heatmap H2, "00 Bank" may be deemed the most focused on and thus may be extracted as an important keyword K2.

It has been assumed in the description with reference to FIG. 4 that a single word that has been focused on the most, among respective word set images I1 and I2, is extracted as an important keyword. However, it is also possible, in other embodiments, to deem each word having a specific degree of focus or higher as an important keyword. In this case, multiple words may be extracted as important keywords from a single word set image I1 or I2.

Meanwhile, the image captioning model 131 may have learned to output a document type corresponding to multiple word set images as a caption. That is, the image captioning model 131 may receive an input of multiple word set images generated from a learning image, and may generate a text (caption) that describes the input word set images. Thereafter, the caption generated by the image captioning model 131 may be compared with a correct answer sheet that indicates the actual document type of the learning image, thereby generating an error, and the image captioning model 131 may be trained to minimize the error.

For example, in order to derive "00 Bank balance certificate" (correct answer) as the caption, the image captioning model 131 may search for respective words arranged in multiple word set images that have been input thereto, and may learn which word is to be focused on in order to derive the correct answer.

The classification unit 140 may classify the type of the document image A by using important keywords input thereto. The classification unit 140 may include a document classification model for document classification, and the document classification model may be based on an RNN. The classification unit 140 classifies document types by using important keywords input from the text summarization unit 130, and thus can perform document classification with a high degree of accuracy while minimizing the complexity of the RNN model. That is, the classification unit 140 utilizes relatively few important keywords, instead of all words included in the document image A, and the document classification model can thus be implemented with a minimum size. In addition, important keywords correspond to important words focused on by the image captioning model 131, and have been generated to minimize the influence of erroneous character recognition or a change in format of the document image A. Therefore, the classification unit 140 can perform document classification with a high degree of accuracy by using important keywords.

In some embodiments, a group model may be used as the document classification model of the classification unit 140. That is, a group model may be used to distribute words indicating the same document type across a space through word embedding, and they may be grouped to generate groups corresponding to respective document types. Therefore, a group in which important keywords that have been input are positioned may be identified, and the document type corresponding to the relevant group may be extracted, thereby classifying the document type. Even when a group model is used, the amount of texts that are input can be reduced by using important keywords. This is advantageous in that document classification can be performed with a high degree of accuracy while minimizing the complexity of the model.

Figure 5:
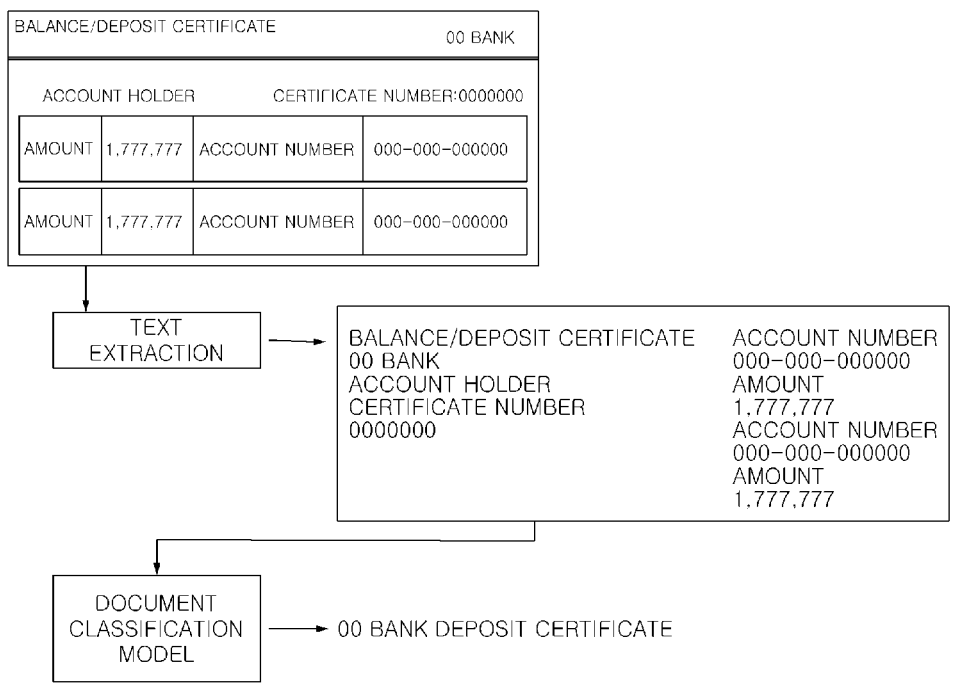
FIG. 5 schematically illustrates a method for classifying documents without a summary regarding a text extracted from a document image.

FIG. 5 schematically illustrates a method for classifying documents without a summary regarding a text extracted from a document image. Referring to FIG. 5, a document image may be subject to text extraction, thereby extracting words included in the document image, and the extracted words may all be input to a document classification model. In this case, an account number such as "000-000-000000", which is irrelevant to any feature for document classification, may be input together and then analyzed. If an RNN model is used as the document classification model, the RNN needs to have a size large enough to receive an entire text as an input, and values not related to document classification are also input to the document classification model, thereby causing problems such as degraded document classification accuracy.

Figure 6:
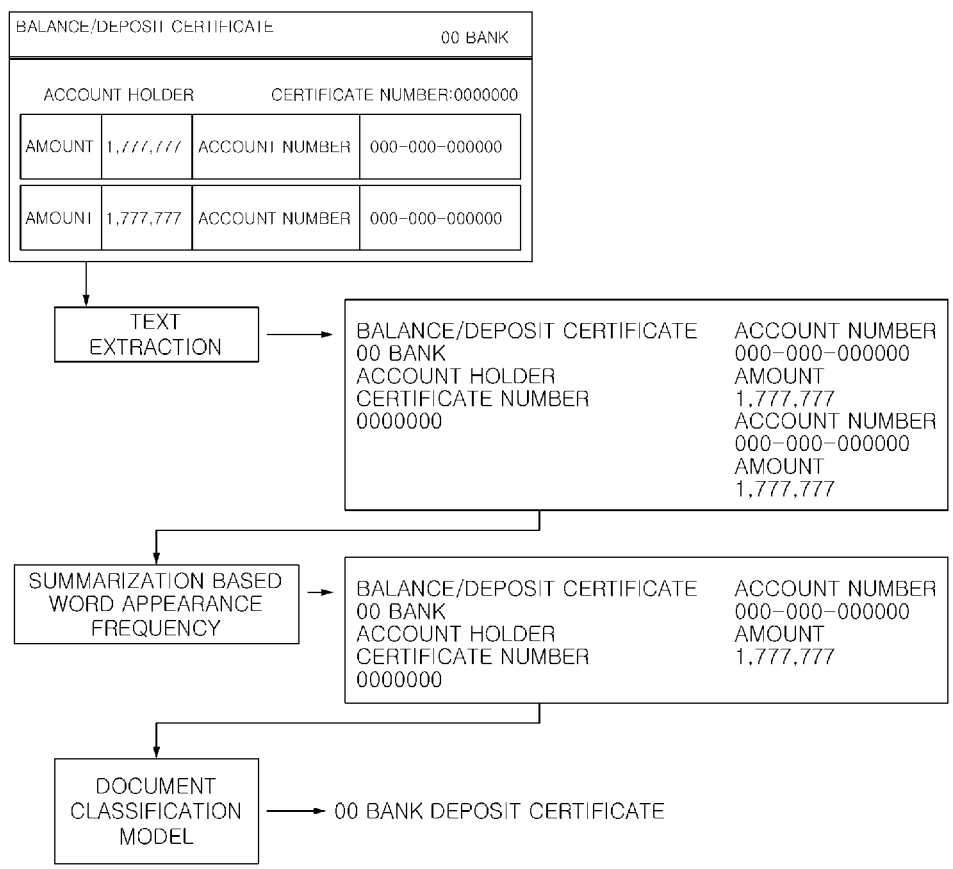
FIG. 6 schematically illustrates a method for classifying a document after summarizing a text extracted from a document image on the basis of frequency.

FIG. 6 schematically illustrates a method for classifying a document after summarizing a text extracted from a document image on the basis of frequency. Referring to FIG. 6, words included in a document image may be extracted through text extraction from the document image, and the extracted words may be summarized on the basis of the frequency with which the documents appear. If summarization is conducted by assuming that the lower the frequency, the higher the degree of importance, overlapping words such as "account number", "000-000-000000", "amount", and "1,777,777", among respective words extracted from the document image, may be deleted. There is still a problem in that words unnecessary for document classification, such as account number "000-000-000000", are input to the document classification model. It is also possible to conduct summarization by assuming that the higher the frequency, the higher the degree of importance, in some embodiments. However, this case may involve a problem in that important words that appear only once, such as "00 Bank" and "balance/deposit certificate", may be deleted, thereby degrading classification accuracy.

Figure 7:
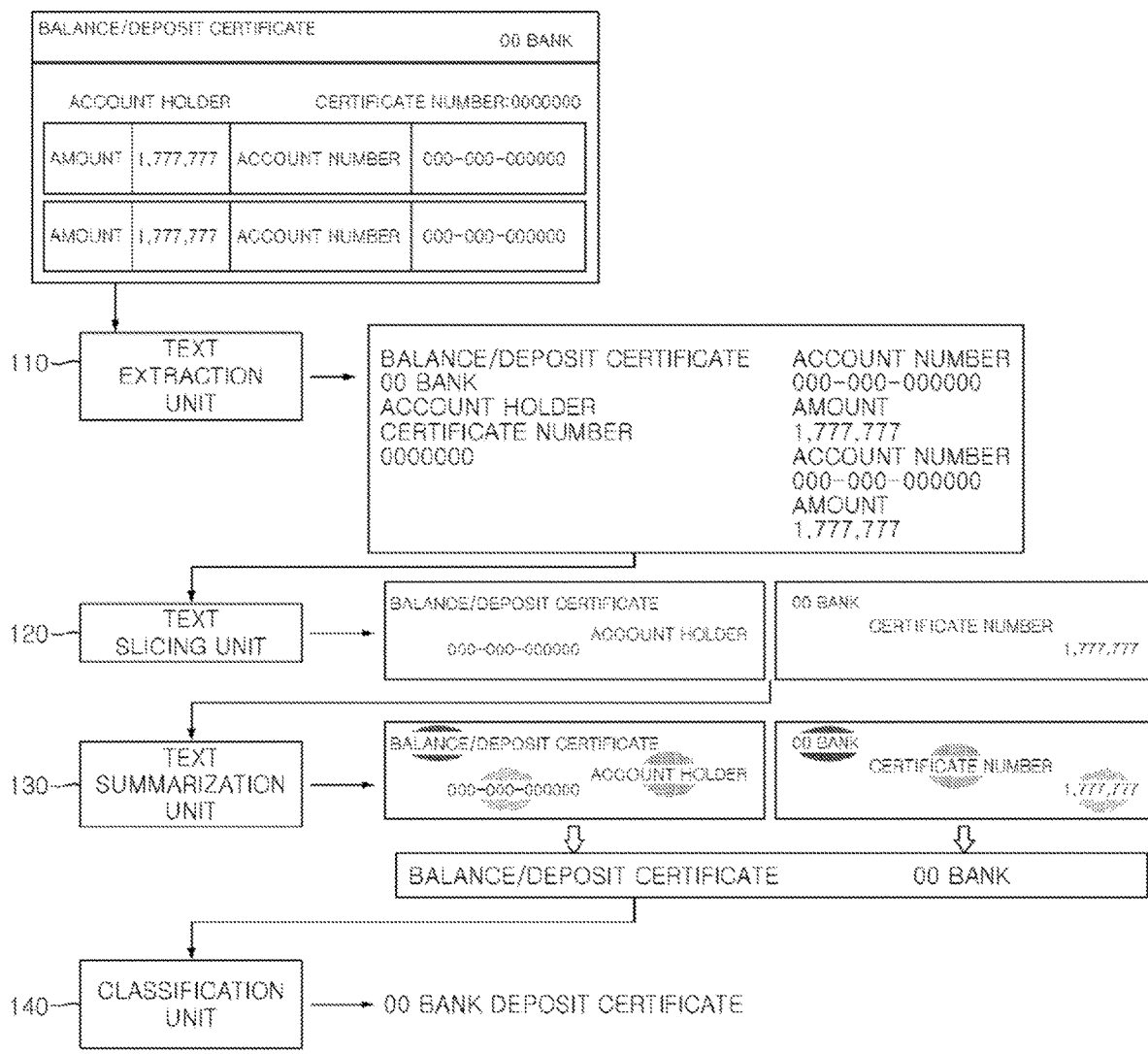
FIG. 7 schematically illustrates document classification using a text-based document classification device according to an embodiment of the present disclosure.

FIG. 7 schematically illustrates document classification using a text-based document classification device according to an embodiment of the present disclosure. Referring to FIG. 7, the text extraction unit 110 may extract words from a document image. In addition, the text slicing unit 120 may generate word sets so as to minimize the degree of similarity between respective words included in the word sets, and may then generate word set images corresponding to respective word sets. The text summarization unit 130 may then extract words focused on by an image captioning model, among word set images that have been input, as important keywords. Words included in the document image may be summarized as important keywords by the text summarization unit 130. Therefore, the document classification model can perform document classification with a minimized model size. In addition, the text summarization unit 130 extracts words focused on by the image captioning model to generate a caption as important keywords, thereby making it possible to accurately summarize respective words semantically. Therefore, the text-based document classification device according to an embodiment of the present disclosure can improve document classification accuracy while minimizing the model size of the document classification model.

Figure 8:
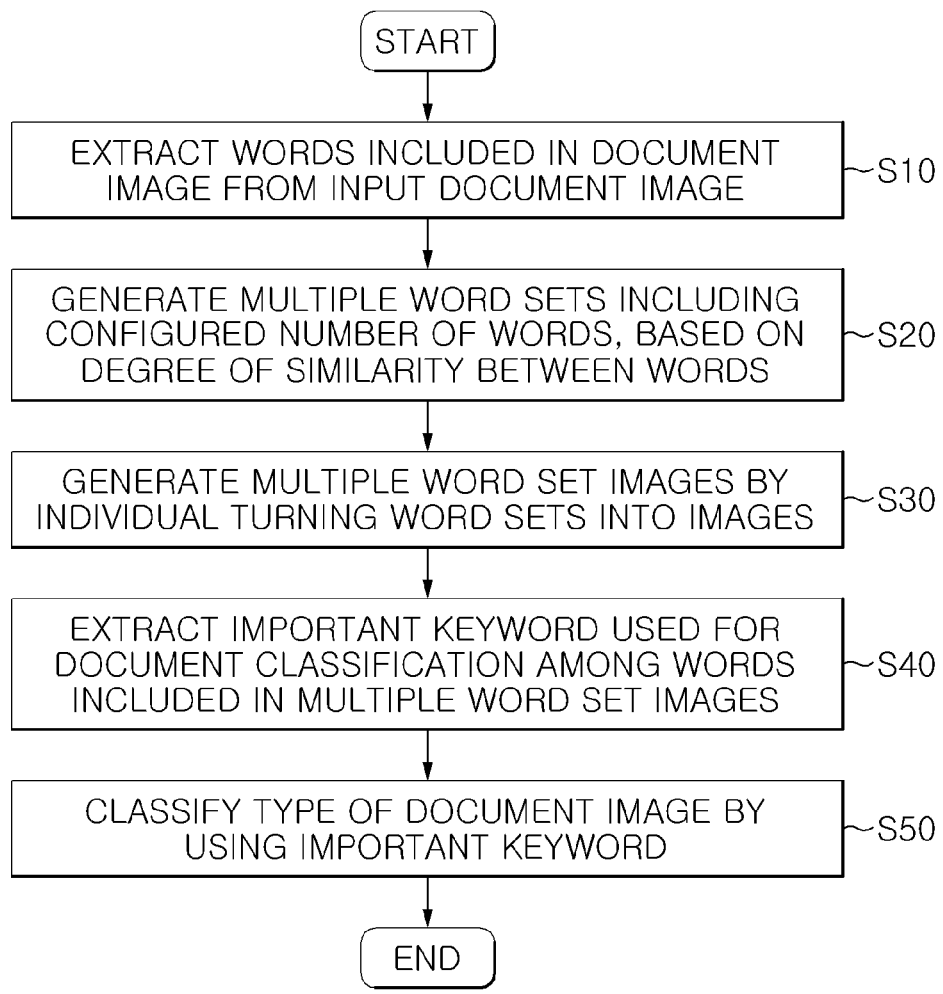
FIG. 8 is a flowchart of a text-based document classification method according to an embodiment of the present disclosure.

FIG. 8 is a flowchart of a text-based document classification method according to an embodiment of the present disclosure. Respective steps of the document classification method may be performed by the document classification device 100 or the computing device 12 illustrated in FIG. 1 and/or FIG. 9 and mentioned in descriptions with reference to the drawings.

Referring to FIG. 8, the computing device may extract, from a document image that has been input, words included in the document image (S10). The computing device may apply a character recognition algorithm (for example, OCR) to the document image, and may extract words from the document image by using the character recognition algorithm. Any type of character recognition algorithm is available as long as characters can be extracted from the document image.

The computing device may generate word sets including a configured number of words, based on the degree of similarity between words (S20). The computing device may first calculate the degree of similarity between extracted words, and may obtain the degree of semantic similarity between words through word embedding (for example, word2vec) in some embodiments. There computing device may then generate word sets so as to include a configured number of words so as to minimize the degree of similarity between words included in the same word set. That is, the computing device may combine words having a low degree of similarity, thereby generating word sets having a minimized degree of similarity between words in the sets. By minimizing the degree of similarity between words in words sets, the semantic correlation between words in respective word sets may be minimized.

The computing device may then turn word sets into images, thereby generating word set images (S30). Positions of words in respective word set images may be randomly arranged, but the words may have the same configured size. That is, words may maintain an identical size in order to prevent any influence of the size of words in the word set images during summarization. In addition, the computing device generates and uses word set images instead of word sets such that, even if words are erroneously recognized during text extraction from the document image, or even if the format of the document image itself is partially changed, the influence thereof can be minimized.

After generating word set images, the computing device may extract important keywords used for document classification from words included in the word set images (S40). That is, important keywords may be generated as a result of summarizing words extracted from the document image. The computing device may include a captioning model, and may extract important keywords from word set images by using the image captioning model. The image captioning model may have learned to generate a text (caption) that described images that have been input, and may be configured to perform image captioning according to a show-attend-and-tell scheme. Accordingly, during a caption generating process, the image captioning model may focus on a word included in the multiple image set images, and may generate a caption on the basis of the word in focus. Words focused on by the image captioning model may be deemed to be important words in the corresponding word set images. Therefore, the computing device may deem words focused on by the image captioning model to be important keywords.

Meanwhile, the image captioning model may generate heatmaps regarding words focused on during caption generation. The heatmaps indicate areas focused on by the image captioning mode, among images included in word set images, while generating a caption, and the more an area is focused on, the more densely the area may be shaded. Therefore, words focused on by the image captioning model can be specified and extracted by using heatmaps. The computing device may extract a single word the most focused on from each word set image as an important keyword, but it is also possible, in other embodiments, to deem each word having a specific degree of focus or higher as an important keyword.

The image captioning model may have learned to output a document type corresponding to multiple word set images as a caption. The image captioning model may receive an input of multiple word set images generated from a learning image, and may generate a text (caption) that describes the input word set images. Thereafter, the caption generated by the image captioning model may be compared with a correct answer sheet that indicates the actual document type of the learning image, thereby generating an error, and the image captioning model may be trained to minimize the error.

The computing device may then classify the type of document image by using important keywords (S50). The computing device may include a document classification model for document classification, and the document classification model may be based on an RNN. In this case, the document classification model may classify the document type by using important keywords that have been input, and thus can perform document classification with a high degree of accuracy while minimizing the complexity of the RNN model. In some embodiments, a group model may be used as the document classification model, and even when a group model is used, there may be an advantage in that document classification can be performed with a high degree of accuracy while minimizing complexity.

Figure 9:
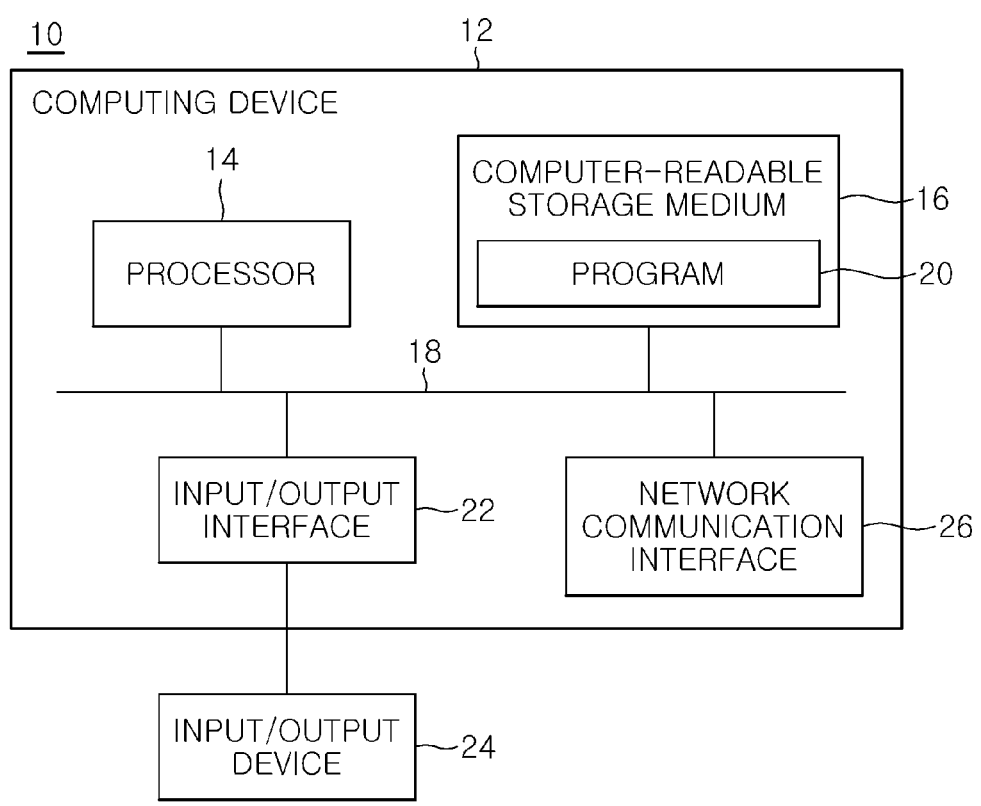
FIG. 9 illustrates an exemplary hardware configuration of a computing device by which methods according to various embodiments of the present disclosure can be implemented.

FIG. 9 is a block diagram illustrating a computing environment 10 which can be appropriately used in exemplary embodiments. In the illustrated embodiments, respective components may have different functions and abilities in addition to those described below, and the environment may include additional components addition to those described below.

The illustrated computing environment 10 includes a computing device 12. In an embodiment, the computing device 12 may be a device for document classification (for example, document classification device 100).

The computing device 12 includes at least one processor 14, a computer-readable storage medium 16, and a communication bus 18. The processor 14 may cause the computing device 12 to operate according to exemplary embodiments mentioned above. For example, the processor 14 may execute at least one program stored in the computer-readable storage medium 16. The at least one program may include at least one computer-executable command, and the computer-executable command may be configured such that, when executed by the processor 14, the same causes the computing device 12 to perform operations according to exemplary embodiments.

The computer-readable storage medium 16 is configured to store computer-executable commands or program codes, program data and/or other types of appropriate information. A program 20 stored in the computer-readable storage medium 16 includes a set of commands executable by the processor 14. In an embodiment, the computer-readable storage medium 16 may be a memory (a volatile memory such as a random access memory, a nonvolatile memory, or an appropriate combination thereof), at least one magnetic disk storage device, optical disk storage devices, flash memory devices, another type of storage medium which is accessed by the computing device 12, and which can store desired information, or an appropriate combination thereof.

The communication bus 18 interconnects various other components of the computing device 12, including the processor 14 and the computer-readable storage medium 16.

The computing device 12 may include at least one input/output interface 22 configured to provide an interface for at least one input/output device 24, and at least one network communication interface 26. The input/output interface 22 and the network communication interface 26 are connected to the communication bus 18. The input/output device 24 may be connected to other components of the computing device 12 through the input/output interface 22. Examples of the input/output device 24 may include a pointing device (mouse, trackpad, or the like), a keyboard, a touch input device (touchpad, touchscreen, or the like), a voice or sound input device, an input device such as various kinds of sensor devices and/or imaging devices, and/or an output device such as a display device, a printer, a speaker, and/or a network card. The exemplary input/output device 24 may be included in the computing device 12 as a component of the computing device 14, or may be connected to the computing device 12 as a separate device distinguished from the computing device 14.

The above-described present disclosure can be implemented as a computer-readable code in a medium in which a program is recorded. The computer-readable medium may continuously store a computer-executable program or may temporarily store the same for execution or download. In addition, the medium may be various types of recording means or storage means having a single piece or multiple pieces of hardware coupled thereto, and may exist distributed across networks without being limited to a medium directly connected to a specific computer system. Examples of the medium may include a magnetic medium such as a hard disk, a floppy disk, and a magnetic tape, an optical recording medium such as a CD-ROM and a DVD, a magneto-optical medium such as a floptical disk, a ROM, a RAM, a flash memory, and the like, and may be configured to store program commands. Other examples of the medium include recording mediums or storage mediums managed by an app store which distributes applications, a site which supplies or distributes various other kinds of software, a server, and the like. Therefore, above detailed descriptions are to be interpreted exemplary, not limiting in any aspect. The scope of the present disclosure is to be determined by reasonable interpretation of the accompanying claims, and encompasses all changed made within the equivalent scope of the present disclosure.

The present disclosure is not limited to the above-described embodiments and accompanying drawings. It will be obvious to those skilled in the art to which the present disclosure pertains that components according to the present disclosure can be substituted, modified, and changed without deviating from the technical idea of the present disclosure.

What is claimed is:

1. A text-based document classification method performed by a processor inside a computing device, the text-based document classification method comprising:
   extracting, from a document image that has been input, words included in the document image by using OCR;
   generating, based on a degree of similarity between the words, a word set comprising a configured number of words, wherein the degree of similarity is calculated by embedding the words using word embedding and determining the degree of similarity between the embedded words;

generating a word set image by individually turning the word set into an image;

extracting an important keyword used for document classification among words included in the word set image by inputting the word set image into an image captioning model; and classifying a type of the document image from the important keyword using a document classification model, wherein, in the extracting of the important keyword, a heatmap indicating an area focused on by the image captioning model in the word set image is extracted and the important keyword is configured by using the heatmap, and wherein the image captioning model is learned such that, when a word set image generated from a learning image is input thereto, a text describing the word set image generated from the learning image is generated, the text and a correct answer sheet regarding a document type of the learning image are compared, thereby generating an error, and the error is minimized.

2. The text-based document classification method of claim 1, wherein, in the generating of the word set, the word set is generated so as to minimize the degree of similarity between the configured number of words included in the word set.

3. The text-based document classification method of claim 2, wherein, in the generating of the word set, the words are subjected to word embedding such that respective words are distributed across a space according to meaning, and a degree of semantic similarity between the words is extracted by calculating a spatial distance between the words.

4. The text-based document classification method of claim 1, wherein, in the generating of the word set image, positions of the words inside the word set image are randomly arranged, and the words have an identically configured size, thereby generating the word set image.

5. The text-based document classification method of claim 1, wherein, in the extracting of the important keyword, when the word set image is input to the image captioning model, a text describing the word set image is generated by using the image captioning model.

6. A non-transitory computer-readable storage medium storing commands which, when executed by a processor, cause a device comprising the processor to perform operations for text-based document classification, the operations comprising:

extracting, from a document image that has been input, words included in the document image;

generating, based on a degree of similarity between the words, a word set comprising a configured number of words;

generating a word set image by individually turning the word set into an image;

extracting an important keyword used for document classification among words included in the word set image by inputting the word set image into an image captioning model; and classifying a type of the document image by using the important keyword, wherein, in the extracting of the important keyword, a heatmap indicating an area focused on by the image captioning model in the word set image is extracted and the important keyword is configured by using the heatmap, and wherein the image captioning model is learned such that, when a word set image generated from a learning image is input thereto, a text describing the word set image generated from the learning image is generated, the text and a correct answer sheet regarding a document type of the learning image are compared, thereby generating an error, and the error is minimized.

7. The non-transitory computer-readable storage medium of claim 6, wherein, in the generating of the word set, the word set is generated so as to minimize the degree of similarity between the configured number of words included in the word set.

8. The non-transitory computer-readable storage medium of claim 7, wherein, in the generating of the word set, the words are subjected to word embedding such that respective words are distributed across a space according to meaning, and a degree of semantic similarity between the words is extracted by calculating a spatial distance between the words.

9. The non-transitory computer-readable storage medium of claim 6, wherein, in the extracting of the important keyword, when the word set image is input into the image captioning model, a text describing the word set image is generated by using the image captioning model.

10. A document classification device comprising a processor, the processor being configured to perform:

extracting, from a document image that has been input, words included in the document image;

generating, based on a degree of similarity between the words, a word set comprising a configured number of words;

generating a word set image by individually turning the word set into an image;

extracting an important keyword used for document classification among words included in the word set image by inputting the word set image into an image captioning model; and classifying a type of the document image by using the important keyword, wherein, in the extracting of the important keyword, a heatmap indicating an area focused on by the image captioning model in the word set image is extracted and the important keyword is configured by using the heatmap, and wherein the image captioning model is learned such that, when a word set image generated from a learning image is input thereto, a text describing the word set image generated from the learning image is generated, the text and a correct answer sheet regarding a document type of the learning image are compared, thereby generating an error, and the error is minimized.

11. The document classification device of claim 10, wherein, in the generating of the word set, the word set is generated so as to minimize the degree of similarity between the configured number of words included in the word set.

12. The document classification device of claim 11, wherein, in the generating of the word set, the words are subjected to word embedding such that respective words are distributed across a space according to meaning, and a degree of semantic similarity between the words is extracted by calculating a spatial distance between the words.

13. The document classification device of claim 10, wherein, in the generating of the word set image, positions of the words inside the word set image are randomly arranged, and the words have an identically configured size, thereby generating the word set image.

14. The document classification device of claim 10, wherein, in the extracting of the important keyword, when the word set image is input to the image captioning model, a text describing the word set image is generated by using the image captioning model.

* * * * *